(12) United States Patent
Steinberger et al.

(10) Patent No.: US 11,562,865 B2
(45) Date of Patent: Jan. 24, 2023

(54) METHOD AND APPARATUS FOR PROTECTING A LOAD AGAINST AN OVERCURRENT

(71) Applicant: Future Systems Besitz GmbH, Roedental (DE)

(72) Inventors: Philipp Steinberger, Coburg (DE); Peter Spiel, Regensburg (DE); Hubert Lenker, Sonneberg (DE)

(73) Assignee: Future Systems Besitz GmbH, Roedental (DE)

( * ) Notice: Subject to any disclaimer, the term of this patent is extended or adjusted under 35 U.S.C. 154(b) by 0 days.

(21) Appl. No.: 17/249,668

(22) Filed: Mar. 9, 2021

(65) Prior Publication Data
US 2022/0029415 A1 Jan. 27, 2022

(30) Foreign Application Priority Data

Jul. 24, 2020 (EP) .................................. 20187766

(51) Int. Cl.
*H01H 9/54* (2006.01)
*H02H 3/087* (2006.01)
*H02H 11/00* (2006.01)

(52) U.S. Cl.
CPC ............ *H01H 9/542* (2013.01); *H02H 3/087* (2013.01); *H02H 11/003* (2013.01); *H01H 2009/546* (2013.01)

(58) Field of Classification Search
CPC ................................................... H01H 9/542
See application file for complete search history.

(56) References Cited

U.S. PATENT DOCUMENTS 6,665,591 B1  12/2003  Griepentrog et al.
10,498,331 B2 * 12/2019  Schmitz .................. H01H 9/56
(Continued)

FOREIGN PATENT DOCUMENTS

EP     3101678 A1    12/2016
EP    2 801 994 B1    2/2019
(Continued)

OTHER PUBLICATIONS

European Search Report corresponding to European application No. EP20187766 dated Jan. 1, 2021 (2 pages).

*Primary Examiner* — Jared Fureman
*Assistant Examiner* — Christopher J Clark
(74) *Attorney, Agent, or Firm* — Maginot, Moore & Beck LLC (57) ABSTRACT

A hybrid load protection apparatus (1) comprises a primary power supply path (1A) between input terminal and output terminals (2, 3) and a controllable mechanical switch (5A) connected in series with a primary coil (4A-1) coupled inductively to a secondary coil (4A-2) providing a voltage, $U_A$, corresponding to a current rise speed of the electrical current flowing through the primary path (1A). The voltage, $U_A$, is applied directly to a driver input (IN) of a first driver circuit (6A) to trigger automatically a switch-off of the mechanical switch (5A) within a first switch-off period ($\Delta t1$) to interrupt the primary power supply path (1A). A secondary power supply path (1B) is provided in parallel to the primary path (1A) and having a further coil (4B) connected in series with a semiconductor power switch (5B). wherein a second driver circuit (6B) associated with the secondary path (1B) detects an increasing electrical current, I, flowing through the secondary path (1B) caused by the interruption of the primary current path (1A) on the basis of a voltage drop ($\Delta U_4$) generated by the further coil (4B) and a non-linear voltage drop ($\Delta U_5$) along the semiconductor power (Continued)

switch (5B) applied as a sum voltage ($U_B$) directly to a driver input (DESAT) at a high voltage side of the second analog driver circuit (6B) to trigger automatically a switch-off of the semiconductor power switch (5B) within a second switch-off period ($\Delta t2$) to interrupt the secondary power supply path (1B).

12 Claims, 6 Drawing Sheets

(56) References Cited

U.S. PATENT DOCUMENTS

| | | |
|---|---|---|
| 2009/0310270 A1 | 12/2009 | Burns et al. |
| 2010/0254046 A1* | 10/2010 | Liu .................. H02H 3/087 |
| | | 361/13 |
| 2014/0332500 A1* | 11/2014 | Pessina .............. H01H 9/542 |
| | | 218/4 |
| 2019/0310289 A1* | 10/2019 | Miller ............... G01R 15/181 |
| 2020/0403396 A1* | 12/2020 | Chen ................. H02H 3/021 |
| 2022/0006281 A1* | 1/2022 | Shen ................. H02H 3/087 |

FOREIGN PATENT DOCUMENTS

| | | |
|---|---|---|
| EP | 3 459 100 A1 | 3/2019 |
| WO | 2011108874 A2 | 9/2011 |
| WO | 2018002198 A1 | 1/2018 |
| WO | 2019063933 A1 | 4/2019 |

* cited by examiner

HYBRID LOAD PRITECTION APPARATUS

NORMAL OPERATION

FIG 5B

1A PRIMARY POWER SUPPLY PATH

FIG 5C

1B SECONDARY POWER SUPPLY PATH

FIG 5D

TOTAL LOAD CURRENT

METHOD AND APPARATUS FOR PROTECTING A LOAD AGAINST AN OVERCURRENT

This application claims priority to European Application No. EP 20187766.9 filed on Jul. 24, 2020. The entire contents of the above-mentioned patent applications are incorporated herein by reference as part of the disclosure of this U.S. application.

TECHNICAL FIELD

The invention relates to a method and apparatus used to protect a connected electrical load against an overcurrent by using both a mechanical switch in a primary power supply path and a semiconductor power switch in a parallel secondary power supply path.

Electrical loads connected to a power supply network PSN require overcurrent protection. An overcurrent may flow through an electrical conductor or component leading to an excessive generation of heat and damaging the respective electrical equipment or load. There are different causes for generating an overcurrent including short circuits, an incorrect circuit design or ground faults. There exist a variety of conventional overcurrent protection devices such as fuses, electromechanical circuit breakers or solid-state power switches. Fuses do melt when an overcurrent occurs thus interrupting the electrical current and protecting the load. However, fuses do melt only at relative high current amplitudes so that much electrical energy can be transferred to the connected load before the respective fuse does melt thus increasing the risk of damaging components of the connected electrical load. Further, after the cause for the overcurrent current has been cleared, it is necessary to replace the affected fuse.

Other conventional electrical protection devices employ current sensors to measure an electrical current flowing to the connected load to detect a critical situation and to trigger automatically an electronic or electromechanical switch to interrupt the current flow in case that a critical situation does arise and is detected. A current measurement element such as a Hall sensor may measure the flowing current and supply measurement values to a controller or control logic which can switch off a switching component in case that the measured current exceeds a predefined threshold value. Circuit breaker and newer protection devices use semiconductor switches such as MOSFETs to protect connected loads against overcurrents. With an increasing electrical current flowing via a switched-on semiconductor switch, a voltage drop along this semiconductor switch can also increase so that there occurs a higher power loss at the respective semiconductor switch. This increasing power loss may cause damaging and even destruction of the semiconductor switch itself and/or of electronic components within the connected electrical load. Consequently, conventional protection circuits evaluate a voltage drop along an integrated semiconductor switch and trigger a switch-off of the semiconductor switch as soon as the voltage drop along the semiconductor switch exceeds a predefined threshold value. However, in this conventional approach, the switch-off mechanism does only take place after the electrical current has already reached a relatively high amplitude, i.e. it involves a long switch-off period. All this protection circuits work comparatively slow and require a high current level to trigger the switching component to perform a switching-off of the power supply path.

Accordingly there is a need to provide a protection apparatus and a corresponding method which protects a connected load more efficiently and reliably against an overcurrent and reduces the power loss during normal operation

SUMMARY OF THE INVENTION

The invention provides according to the first aspect a hybrid load protection apparatus comprising
a primary power supply path provided between an input terminal and an output terminal of said hybrid load protection apparatus and having a controllable mechanical switch connected in series with a primary coil coupled inductively to a secondary coil providing a voltage, $U_A$, corresponding to a current rise speed of the electrical current flowing through the primary power supply path, wherein the provided voltage, $U_A$, is applied directly to a driver input at a low voltage side of a first driver circuit associated with the primary power supply path to trigger automatically a switch-off of the mechanical switch within a first switch-off period, $\Delta t1$, to interrupt the primary power supply path and comprising
a secondary power supply path provided in parallel to the primary power supply path between the input terminal and the output terminal of the hybrid load protection apparatus and having a further coil connected in series with a semiconductor power switch, wherein a second driver circuit associated with the secondary power supply path is provided to detect an increasing electrical current flowing through the secondary power supply path caused by the interruption of the primary current path on the basis of a voltage drop generated by the further coil and a non-linear voltage drop along the semiconductor power switch applied as a sum voltage, $U_B$, directly to a driver input at a high voltage side of the second driver circuit to trigger automatically a switch-off of the semiconductor power switch provided in the secondary power supply path within a second switch-off period, $\Delta t2$, to interrupt the secondary power supply path such that a generation of an electrical arc during switch-off of the mechanical switch (5A) is suppressed and the input terminal and the output terminal of the hybrid load protection apparatus are separated from each other.

With the hybrid load protection apparatus according to the first aspect of the present invention, the secondary power supply path is adapted to suppress the generation of an electrical arc of a mechanical contact within the mechanical switch of the primary power supply path which is switched off under control of the first analog driver circuit associated with the primary power supply path.

Accordingly, it is an advantage of the hybrid load protection apparatus according to the present invention that the operation safety is increased during operation of the hybrid load protection apparatus, in particular if a switch-off of the mechanical switch within the primary supply path is triggered.

In a possible embodiment of the hybrid load protection apparatus according to the first aspect of the present invention, the first analog driver circuit provided in the primary power supply path and the second analog driver circuit provided in the secondary power supply path are both adapted to generate automatically a trigger signal at a driver output OUT at a high voltage side of the respective driver circuit.

If a signal applied at the driver input of the first analog driver circuit exceeds a predefined low voltage level, the first analog driver circuit generates automatically a trigger signal at the driver output OUT at its high voltage side to switch off the mechanical switch within the associated primary power supply path.

If a sum voltage applied to the driver input DESAT of the second analog driver circuit exceeds an associated configurable threshold voltage, the second analog driver circuit is adapted to generate automatically a trigger signal at the driver output OUT at its high voltage side to switch off the semiconductor power switch within the associated secondary power supply path.

In a possible embodiment, the first predefined switch-off period $\Delta t1$ for switching off the mechanical switch provided in the primary power supply path is less than 1 msec, in particular in a range between 10 µsec and 1 msec.

In a further possible embodiment of the hybrid load protection apparatus according to the first aspect of the present invention, the mechanical switch provided in the primary power supply path comprises a Thomson switch.

In a further possible embodiment of the hybrid load protection apparatus according to the first aspect of the present invention, the mechanical switch provided in the primary power supply path comprises a switch-off acceleration unit adapted to accelerate a switch-off of a mechanical contact of the mechanical switch in response to a trigger signal received from the driver output at the high voltage side of the first analog driver circuit associated with the primary power supply path to interrupt the primary power supply path.

In a further possible embodiment of the hybrid load protection apparatus according to the first aspect of the present invention, the switch-off acceleration unit of the mechanical switch provided in the primary power supply path comprises a pyrotechnic switch-off acceleration unit having a pyrotechnic charge fired in response to the trigger signal received from the driver output at the high voltage side of the first analog driver circuit to generate a pressurized gas which accelerates the switch-off of the mechanical contact of the mechanical switch to interrupt the primary power supply path.

In a further possible embodiment of the hybrid load protection apparatus according to the first aspect of the present invention, the switch-off acceleration unit of the mechanical switch provided in the primary power supply path comprises a piezo element driving unit.

In a further possible embodiment of the hybrid load protection apparatus according to the first aspect of the present invention, wherein when the mechanical switch provided in the primary power supply path is switched off to interrupt the primary power supply path, the electrical current does flow increasingly into the secondary power supply path sensed by the coil in the secondary power supply path and the magnetic input energy is transformed into heat by means of a low impedance resistor provided in the secondary power supply path.

In a further possible embodiment of the hybrid load protection apparatus according to the first aspect of the present invention, wherein at least one energy storage unit, in particular a capacitor, is connected to the input terminal to store electrical energy used by the switch-off acceleration unit of the mechanical switch to accelerate the switch-off of the mechanical contact of the mechanical switch provided in the primary power supply path or is used as an auxiliary power supply.

In a further possible embodiment of the hybrid load protection apparatus according to the first aspect of the present invention, the first switch-off period to switch off the mechanical switch in the primary power supply path and the second switch-off period to switch off subsequently the semiconductor power switch in the secondary power supply path are adjustable.

In a further possible embodiment of the hybrid load protection apparatus according to the first aspect of the present invention, the input terminal is connected to a power supply network to receive an AC power supply voltage or is connected to a DC power supply source to receive a DC power supply voltage, wherein an electrical load protected by the hybrid load protection apparatus is connected to the output terminal of the hybrid load protection apparatus.

In a further possible embodiment of the hybrid load protection apparatus according to the first aspect of the present invention, the primary power supply path is adapted to carry during normal operation an electrical current having a higher current amplitude than the electrical current flowing through the secondary power supply path.

In a still further possible embodiment of the hybrid load protection apparatus according to the first aspect of the present invention, both driver circuits comprise two galvanically separated parts coupled inductively by transformers to each other.

The invention further provides according to a second aspect a method for protecting a load against an overcurrent.

The invention provides according to the second aspect a method for protecting a load against an overcurrent, wherein said method comprises the steps of:

detecting an overcurrent flowing in a primary power supply path via a mechanical switch to an electrical load to trigger automatically a switch-off of the mechanical switch by a first driver circuit associated with the primary power supply path within a first switch-off period to interrupt the primary power supply path and detecting a rise of an electrical current caused by the interruption of the primary power supply path and flowing via a semiconductor power switch to the electrical load, wherein the secondary power supply path is connected in parallel to the primary power supply path, wherein a switching-off of the semiconductor power switch is triggered automatically upon detection of the rising electrical current in the secondary power supply path to interrupt the secondary power supply path within a second switch-off period and to suppress a generation of an electrical arc during switching-off of the mechanical switch in the primary power supply path.

In a possible embodiment of the method according to the second aspect of the present invention, the first switch-off period to switch off the mechanical switch provided in the primary power supply path is less than 1 msec and defined by signal propagation delays along a first control path including the first driver circuit and wherein the second switch-off period to switch off subsequently the semiconductor power switch provided in the secondary power supply path is less than 1 msec and defined by the signal propagation delays along a second control signal path including the second driver circuit.

In a possible embodiment of the method according to the second aspect of the present invention, the first switch-off period and the second switch-off period are adjusted by means of a user interface.

In a further possible embodiment of the method according to the second aspect of the present invention, the total switch-off period to interrupt first the primary power supply path and subsequently the secondary power supply path is less than 2 msec.

In a preferred embodiment, the total switch-off period to interrupt first the primary power supply path and subsequently the secondary power supply path such as to separate an electrical load from a power supply network is in a range between 10 μsec and 2 msec.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
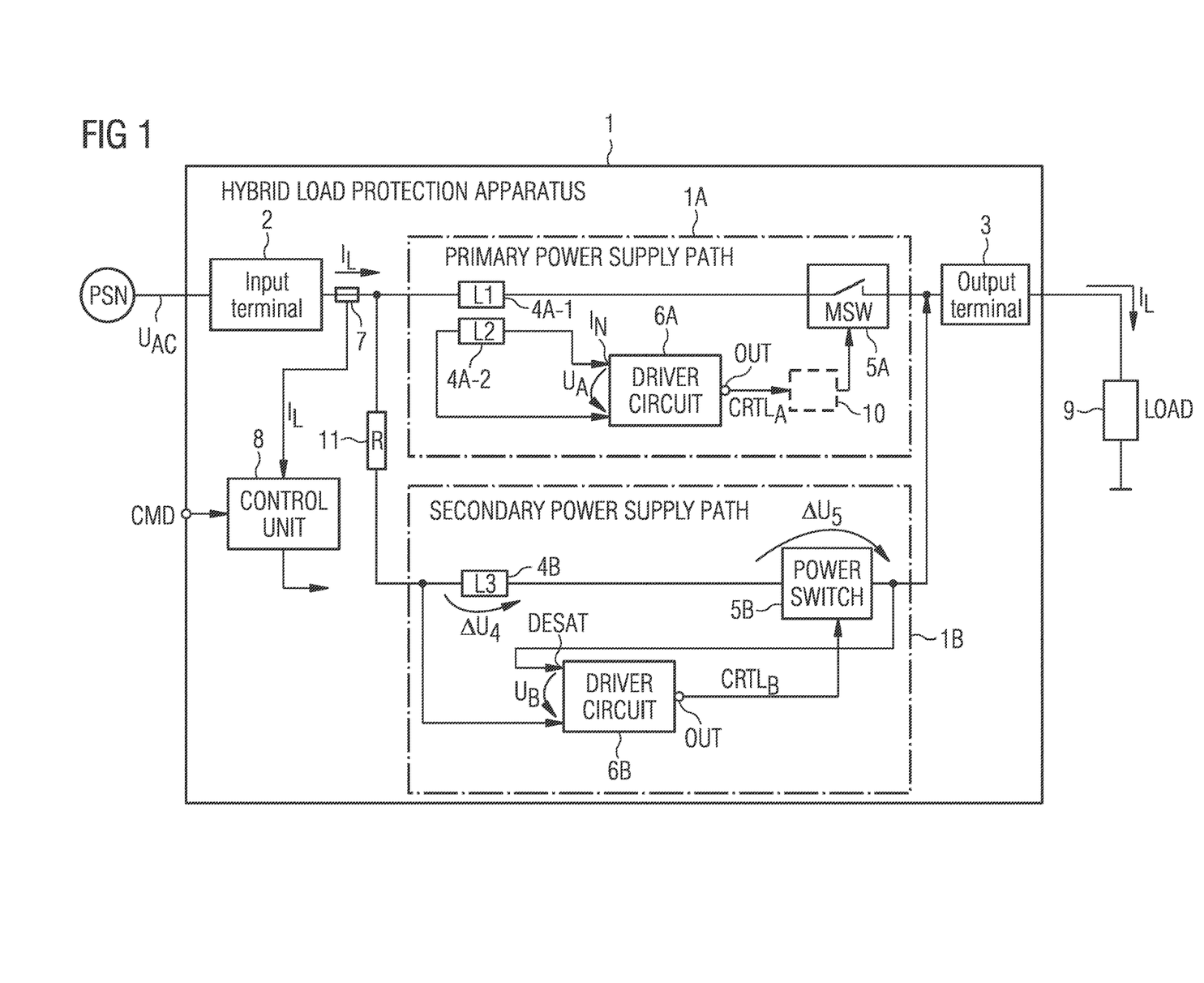
FIG. 1 shows a block diagram for illustrating a possible exemplary embodiment of a hybrid load protection apparatus according to the first aspect of the present invention.

As can be seen from the block diagram of FIG. 1, a hybrid load protection apparatus 1 according to the first aspect of the present invention comprises in the illustrated embodiment an input terminal 2 for connection to a power supply network PSN and an output terminal 3 to which an electrical load 9 can be connected.

The hybrid load protection apparatus 1 as illustrated in the embodiment of FIG. 1 comprises a primary power supply path 1A and a parallel secondary power supply path 1B. The primary power supply path 1A and the secondary power supply path 1B are both connected in parallel between the input terminal 2 and the output terminal 3 of the hybrid load protection apparatus 1.

The primary power supply path 1A provided between the input terminal 2 and the output terminal 3 of the hybrid load protection apparatus 1 comprises a controllable mechanical switch 5A connected in series with a primary coil 4A-1 having an inductivity L. The primary coil 4A-1 generates a voltage drop which is proportional to the current rise speed (dI/dt) of the electrical current I flowing through the primary power supply path 1A (U L dI/dt). The primary coil 4A-1 is coupled inductively to a secondary coil 4A-2 providing a voltage drop $\Delta U_A$ applied directly to a driver input of the driver circuit 6A associated with the primary power supply path 1A to trigger automatically a switch-off of the mechanical switch 5A within a first switch-off period to interrupt the primary power supply path 1A. The voltage $U_A$ corresponds to a current rise speed, dI/dt, of the electrical current I flowing through the primary power supply path 1A.

The secondary power supply path 1B provided in parallel to the primary power supply path 1A has a further coil 4B connected in series with a semiconductor power switch 5B as shown in FIG. 1. The second driver circuit 6B associated with the secondary power supply path 1B is provided to detect an increasing electrical current I flowing through the secondary power supply path 1B caused by the interruption of the primary current path 1A on the basis of a voltage drop $\Delta U_4$ generated by the coil 4B and a non-linear voltage drop $\Delta U_5$ along the semiconductor power switch 5B. The voltage drop $\Delta U_4$ generated by the coil 4B and the non-linear voltage drop $\Delta U_5$ along the semiconductor power switch 5B are applied as a sum voltage $U_B$ directly to a driver input IN of the second driver circuit 6B to trigger automatically a switch-off of the semiconductor power switch 5B provided in the secondary power supply path 1B within a second switch-off period $\Delta t2$ to interrupt the secondary power supply path 1B. After both the primary power supply path 1A and subsequently the secondary power supply path 1B have been interrupted, the input terminal 2 and the output terminal 3 of the hybrid load protection apparatus 1 are separated from each other completely within a total switch-off period ($t_\Sigma = \Delta t_1 + \Delta t_2$) and the connected load 9 is isolated from the power supply network PSN.

The protection apparatus 1 is hybrid meaning that it involves both mechanical and electronic switching.

Figure 4:
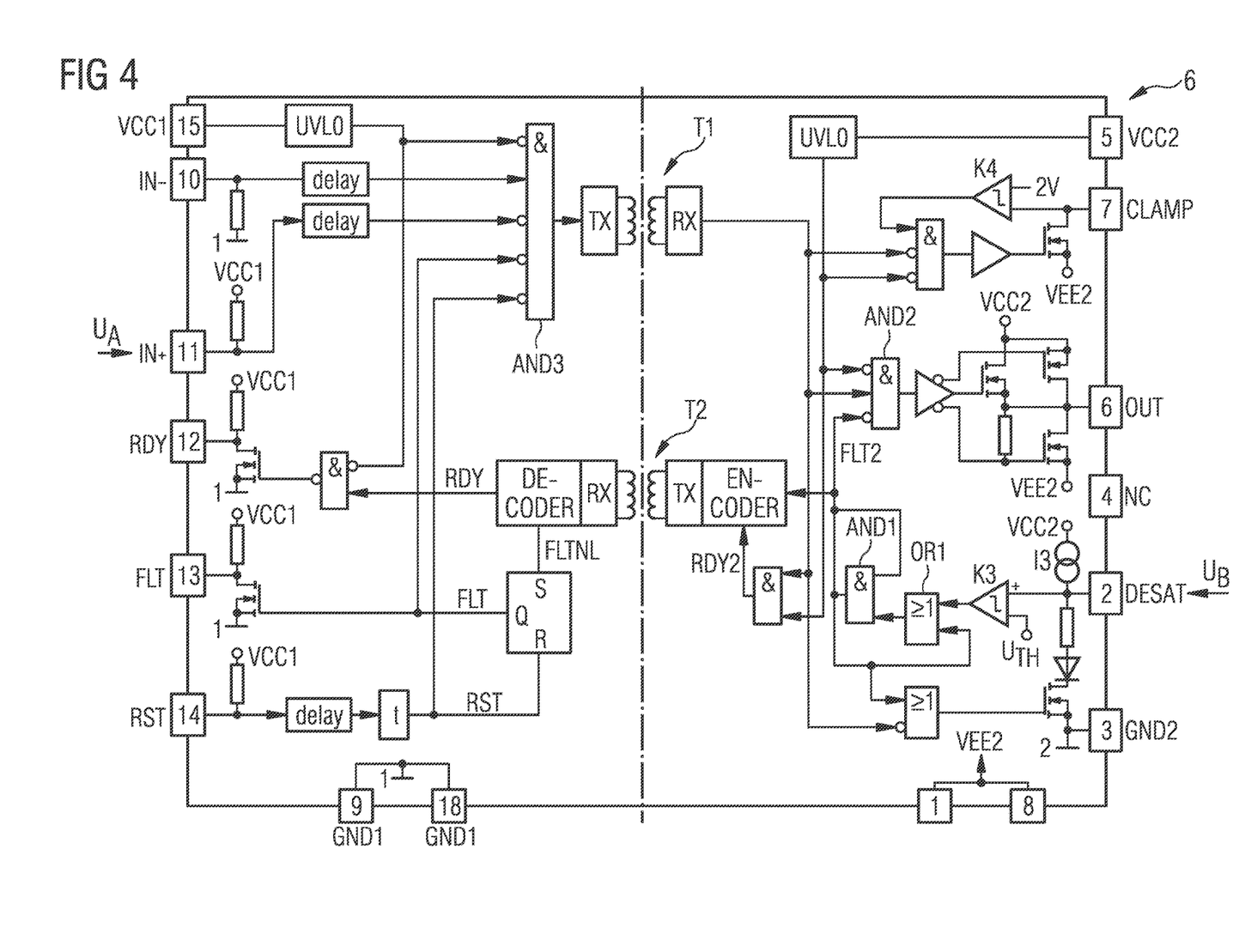
FIG. 4 shows a circuit diagram for illustrating a possible exemplary implementation of a driver circuit integrated in a hybrid load protection apparatus according to the first aspect of the present invention.
Figure 5A:
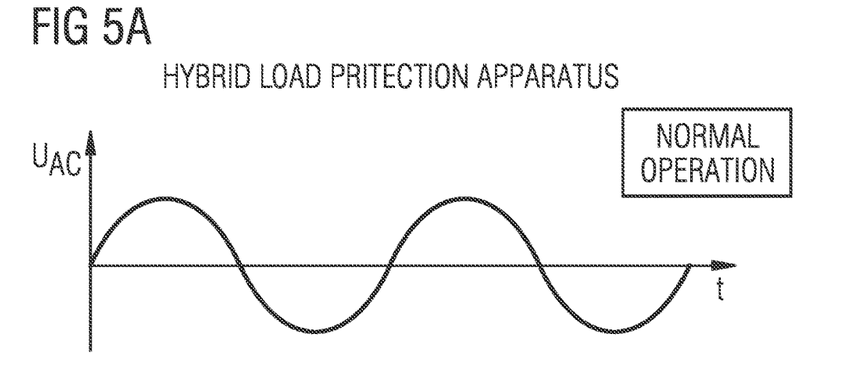
FIGS. 5A-5D show signal diagrams to illustrate a normal operation of the hybrid load protection apparatus 1.
Figure 5B:
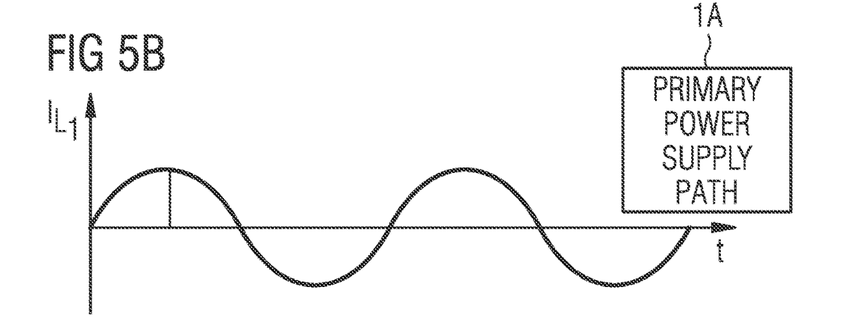
Figure 5C:
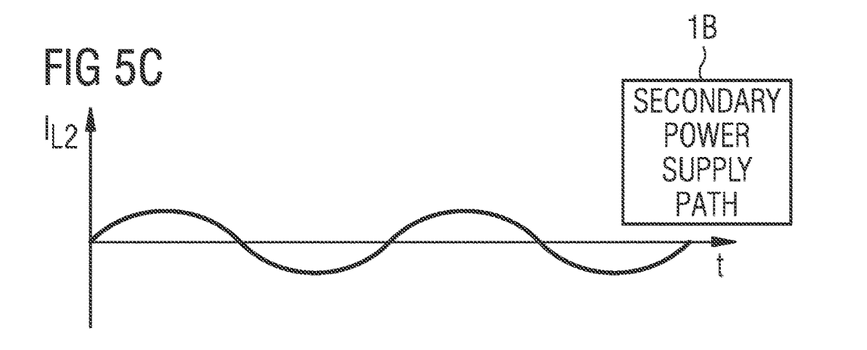
Figure 5D:
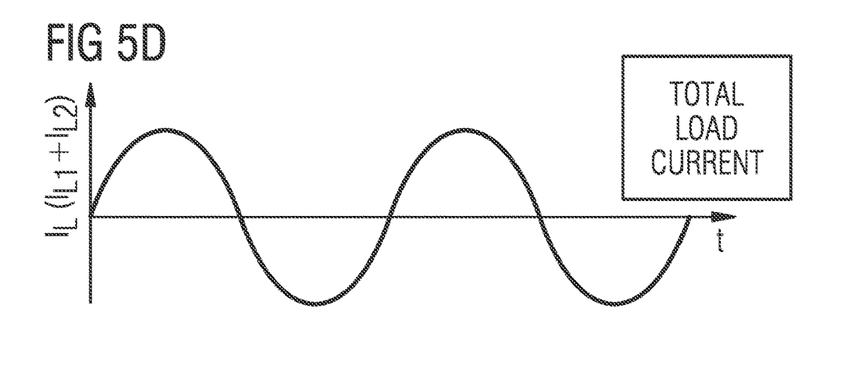

Both power supply paths 1A, 1B comprise an associated driver circuit 6A, 6B as shown in FIG. 1. In a preferred embodiment, the driver circuit 6A and the driver circuit 6B comprise the same circuitry and can be implemented by a driver circuit 6 having a low voltage side and a high voltage side as also illustrated in FIG. 4. The internal circuitry of the driver circuits 6A, 6B is illustrated in FIG. 4. The voltage signal generated by the secondary coil 4A-2 is applied directly to a driver input IN at the low voltage side of the first analog driver circuit 6A. The signal can also be amplified electronically.

In contrast, the sum voltage $U_B$ ($U_B = U_2 = \Delta U_4 + \Delta U_5$) provided by the coil 4B and the semiconductor power switch 5B is applied to a driver input DESAT at the high voltage side of the second analog driver circuit 6B. The signal propagation delay of control signals travelling through the components, in particular gates and comparators integrated in the driver circuit 6, is less than 200 nsec, i.e. 0,195 μsec.

The first analog driver circuit 6A provided in the primary power supply path 1A and the second analog driver circuit 6B provided in the secondary power supply path 1B are both adapted to generate automatically a trigger signal at a driver output OUT at a high voltage side of the respective driver circuit 6A, 6B. Depending on the voltage signal generated by the coil 4A-2 and applied to the driver input IN at the low voltage side of the first driver circuit 6A, a switch-off trigger control signal is generated by the driver circuit 6A and can be applied in a possible embodiment to a power stage 10 as illustrated in FIG. 1. The power stage 10 can comprise an energy storage as well as power semiconductor switches which generate immediately a very high voltage which is triggered in response to the control signal $CRTL_A$ received from the driver output OUT at the high voltage side of the first driver circuit 6A. In a possible embodiment, the mechanical switch 5A can comprise a so-called Thomson switch. A very high voltage combined with a strong current impulse can be applied to a coil of the Thomson switch to provide an immediate forced opening a mechanical contact within the mechanical switch 5A to interrupt the primary power supply path 1A. A signal delay of the signal from the driver input IN at the low voltage side of the driver circuit 6A to the driver output OUT at the high voltage side of the driver circuit 6A is less than 200 nsec. The signal delay in the first control signal path between the coil 4A-2 and the input to the mechanical switch 5A is in a preferred embodiment less than 1 msec and ranges in a preferred embodiment between 1 µsec and 1 msec. This can be achieved because of the very low signal propagation delay caused by the driver circuit 6A and the fast opening caused by the power stage 10 of the primary power supply path 1A.

In the secondary power supply path 1B, the sum voltage $U_B$ across the coil 4B and the semiconductor power switch 5B is not applied to the low voltage side of the driver circuit 6B but to its high voltage side. The sum voltage $U_B$ is applied in a possible embodiment to the DESAT driver input at the high voltage side of the driver circuit 6B to generate a control signal $CRTL_B$ at the driver output OUT which is also located at the high voltage side of the driver circuit 6B. The switch-off control trigger signal $CRTL_B$ can be applied in a possible embodiment directly to a control gate of the semiconductor power switch 5B as also illustrated in FIG. 1. The first predefined switch-off period $\Delta t1$ for switching off the power switch 5B is less than 1 msec and ranges in a preferred embodiment between 1 µsec and 1 msec. In a possible implementation, the switch-off period $\Delta t2$ to switch off the semiconductor power switch 5B if the applied sum voltage $U_B$ exceeds a configurable threshold voltage can be 1-10 µsec.

The mechanical switch 5A provided in the primary power supply path 1A can be connected to a switch-off acceleration unit such as the power switch 10 shown in FIG. 1. The switch-off acceleration unit is adapted to accelerate a switch-off of a mechanical contact within the mechanical switch 5A in response to a trigger signal $CRTL_A$ received from the driver output OUT at the high voltage side of the first analog driver circuit 6A to interrupt the primary power supply path 1A automatically. In a possible embodiment, the switch-off acceleration unit of the mechanical switch 5A provided in the primary power supply path 1A can also comprise a pyrotechnic switch of the acceleration unit having a pyrotechnic charge fired in response to the received trigger signal $CRTL_A$ to generate a pressurized gas with expands and accelerates the switch-off of the mechanical contact of the mechanical switch 5A to interrupt the primary power supply path 1A. In a further possible embodiment, the switch-off acceleration unit at the mechanical switch 5A can also comprise a piezo element driving unit.

When the mechanical switch 5A provided in the primary power supply path 1A, is switched off to interrupt the primary power supply path 1A, an electrical current does flow increasingly into the secondary power supply path 1B which is sensed by the current rise speed sensor component 4B, i.e. the coil 4B, provided in the secondary power supply path 1B. In a possible embodiment, the magnetic input energy can be transformed into heat by means of a resistor 11 as shown in FIG. 1. The resistor 11 can comprise a low impedance resistance of less than 0.5Ω to transform the magnetic input energy into heat.

The hybrid load protection apparatus 1 according to the present invention may comprise additional components. In a possible embodiments at least one energy storage unit can be connected to the input terminal 2 to store electrical energy which may be used by the switch-off acceleration unit of the mechanical switch 5A to accelerate the switch-off of the mechanical contact of the mechanical switch 5A provided in the primary power supply path 1A. The energy stored in the energy storage unit can also be used as an auxiliary power supply or other components within the housing of the hybrid load protection apparatus 1. The energy storage unit can comprise a capacitor having e.g. a capacitance of more than 5 mF.

In a possible embodiment, a load current sensor component 7 such as a Hall sensor can be integrated in the hybrid load protection apparatus 1 to measure continuously a load current $I_L$ flowing to the primary and secondary power supply path 1A, 1B to the connected electrical load 9. The measured load current $I_L$ can be notified in a possible embodiment to a control unit 8 of the hybrid load protection apparatus 1 to provide a load current profile. The load current profile can be evaluated by a microprocessor of the control unit 8 to detect in a possible implementation an overload state of the connected load 9. This may provide for a relatively slow switch-off for small overloads under the control of the microprocessor of the control unit 8. In contrast, the switch-off performed by the first and second driver circuit 6A, 6B is much faster than the switching-off triggered by the control unit 8 because of the very small signal propagation delays of the first and second control path.

The control unit 8 can receive in a possible implementation also a control command CMD via a user interface or from a remote higher level controller of the system. The control unit 8 can trigger in a possible embodiment a switch-off of the mechanical switch 5A in the primary power supply path 1A and of the semiconductor power switch 5B in the secondary power supply path 1B in response to a switch-off command CMD via the first driver circuit 6A and the second driver circuit 6B, respectively.

In the illustrated embodiment of FIG. 1, the input terminal 2 is connected to a power supply network PSN receiving an AC power supply voltage $U_{AC}$. In a possible embodiment, the hybrid load protection apparatus 1 comprises three input terminals 2 and three output terminals 3 for three different AC power supply voltages $U_{AC}$ (power supply phases $L_1$, $L_2 L_3$) received from a power supply network PSN. The amplitude of the AC power supply voltage $U_A$ may differ for different use cases. The frequency of the AC power supply voltage $U_{AC}$ can be for instance 50 Hz or 60 Hz.

During normal operation, most of the current I flowing from the input terminal 2 to the output terminal 3 flows through the primary power supply path 1A. The primary power supply path 1A is adapted to carry during normal operation an electrical current having a higher current amplitude than the electrical current flowing through the secondary power supply path 1B as also illustrated in FIGS. 1A to 1D. The ratio between the amplitude of the current $I_{L1}$ carried by the primary power supply path 1A and the amplitude of the current $I_{L2}$ carried by the secondary power supply path 1B in a normal operation depends on the circuitry and may be for instance 10:1.

Figure 2:
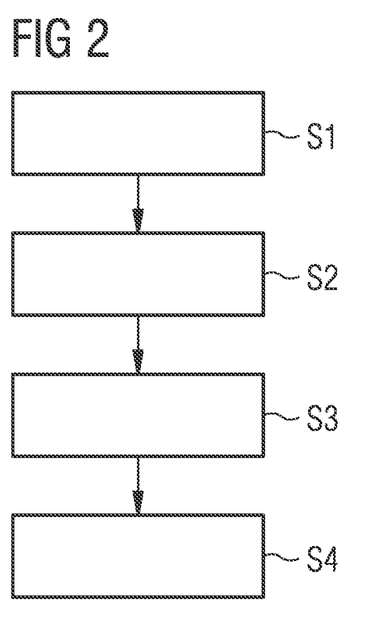
FIG. 2 shows a flowchart for illustrating a possible exemplary embodiment of a method for protecting a load against an overcurrent according to the second aspect of the present invention.

FIG. 2 shows a flowchart for illustrating a possible exemplary embodiment of a method for protecting a load such as the load 9 shown in FIG. 1 against an overcurrent.

In the illustrated embodiment of FIG. 2, the method comprises four main steps.

Figure 6A:
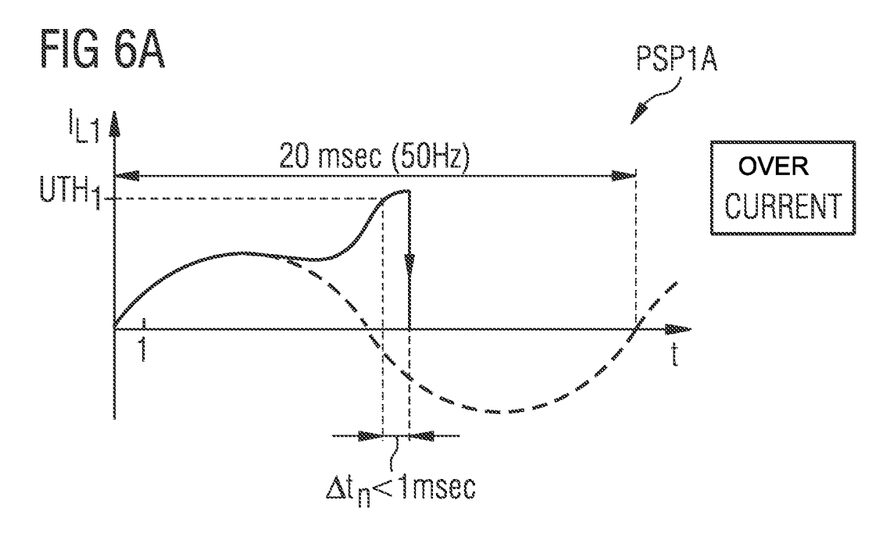
FIGS. 6A-6B illustrate an overcurrent protection performed by a hybrid load protection apparatus.
Figure 6B:
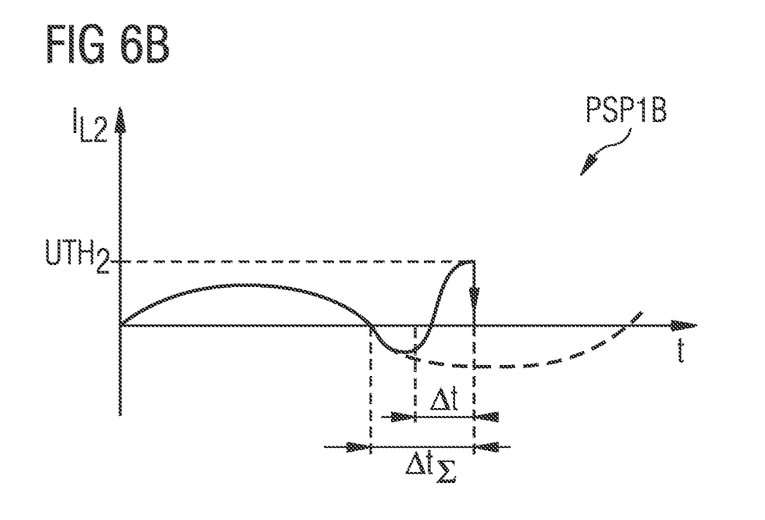

In a first step S1, an overcurrent flowing in the primary power supply path 1A via the mechanical switch 5A to the electrical load 9 is detected to trigger automatically a switch-off in the second step S2 of the mechanical switch 5A by a first driver circuit 6A associated with the primary power supply path 1A within a first switch-off period $\Delta t1$ to interrupt the primary power supply path 1A. This causes a commutation of the electrical current $I_{L1}$ in the primary power supply path leading to a steep rise of the electrical current $I_L$ in the secondary power supply path 1B as also shown in FIGS. 6A, 6B. The current commutation take e.g. about 250 μsecs.

Further, in step S3, a rise of an electrical current caused by the interruption of the primary power supply path 1A and flowing via the semiconductor power switch 5B to the electrical load 9 is detected, wherein switching-off in step S4 of the semiconductor power switch 5B is triggered automatically upon detection of the rising electrical current in the secondary power supply path 1B to interrupt also the secondary power supply path 1B within a second switch-off period Δt2 thus separating the input terminal 2 and the output terminal 3 completely to isolate the electrical load 9 from the power supply network PSN.

The first switch-off period Δt1 to switch off the mechanical switch 5A provided in the primary power supply path 1A is less than 1 msec and defined by the signal propagation delays along a first control signal path including the first driver circuit 6A. The propagation signal delays of the driver circuit 6A are less than 0.2 μsec and the mechanical switch 5A can be opened e.g. after 250 μsec.

The second switch-off period Δt2 to switch off the semiconductor power switch 5B provided in the secondary power supply path 1B is less than 1 msec and defined by the signal propagation delays along a second control signal path including the second driver circuit 6B.

Both switching-off periods, i.e. the first switch-off period Δt1 and the second switch-off period Δt2, are in a preferred embodiment adjustable.

The total switch-off period $\Delta t_\Sigma$ to interrupt first the primary power supply path 1A and subsequently the secondary power supply path 1B is in a possible embodiment less than 2 msec. In a preferred embodiment, the total switch-off period $\Delta t_\Sigma$ ranges between 1 μsec and 2 msec. ($\Delta t_\Sigma = \Delta t_1 + \Delta t_2$).

FIGS. 6A, 6B illustrate the electrical currents $I_{L1}$, $I_{L2}$ flowing through the primary and secondary power supply paths 1A, 1B respectively over time in case an overcurrent is detected in the primary power supply path 1A triggering first a switch-off of the mechanical switch 5A and a subsequent switch-off of the power switch 5B.

Figure 3:
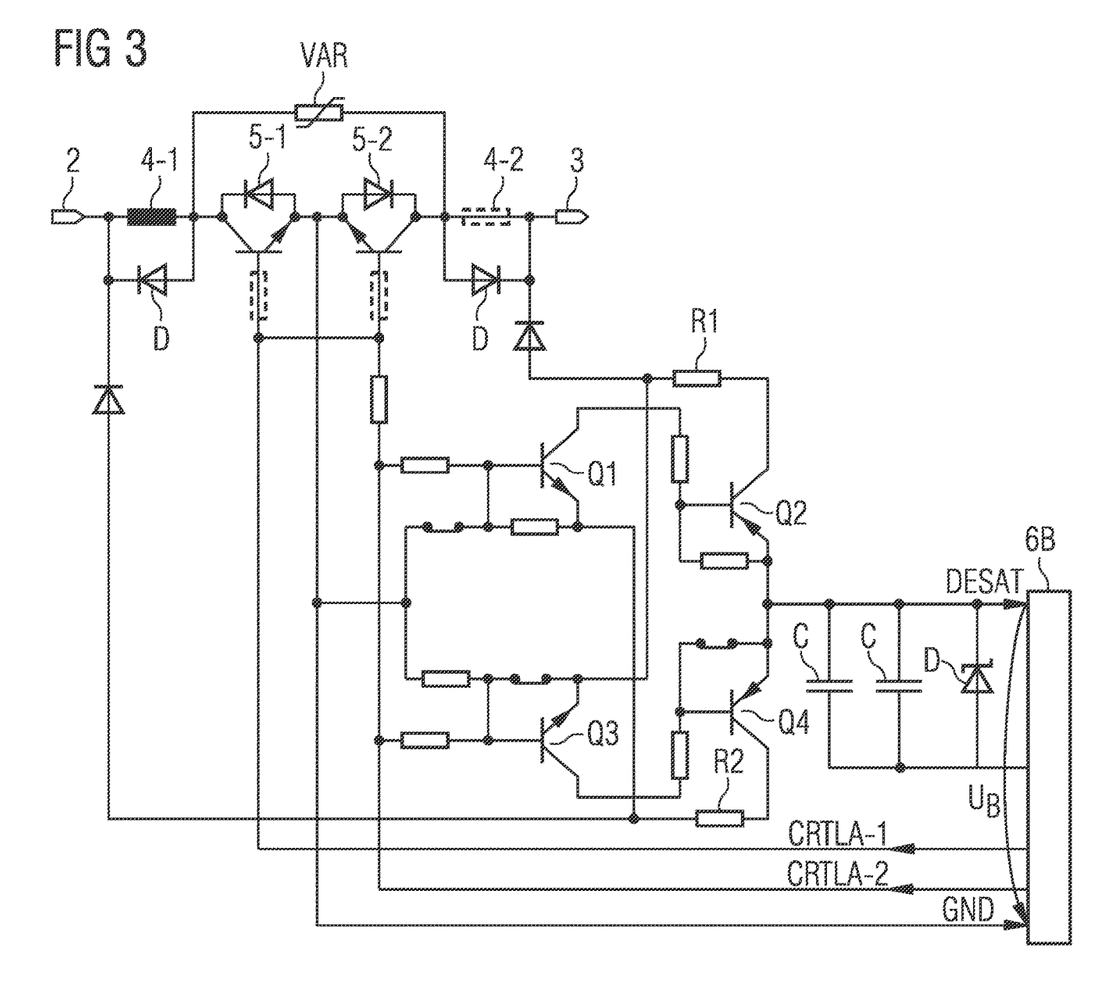
FIG. 3 shows a circuit diagram for illustrating a circuitry connecting a driver circuit to an associated secondary power supply path.

FIG. 3 shows a circuit diagram of a possible exemplary implementation for the connection circuitry provided in the secondary power supply path 1B. In the illustrated embodiment, the input terminal 2 is adapted to receive a phase current (L) from a power supply network PSN having e.g. an AC power supply voltage $U_{AC}$ of 400 Volts or more. In the illustrated implementation, the secondary power supply path 1B comprises two pairs of semiconductor power switches 5-1, 5-2 associated to coils 4-1, 4-2. The illustrated circuit of FIG. 3 is symmetrical for positive current half waves and for negative current half waves of a current flowing through the power supply path 1B. Each coil 4-1, 4-2 comprises an associated semiconductor power switch 5-1, 5-2 as can be seen in FIG. 3. In a possible implementation, both coils 4-1, 4-2 comprise an inductivity L of around 2 Microhenry. An additional varistor VAR can be provided to eliminate disturbances. Further, diodes D can be connected in parallel to each coil 4-1, 4-2 to reduce self-induction. Both semiconductor power switches 5-1, 5-2 are connected to a bridge rectifier circuit comprising in the illustrated implementation two pairs of complementary transistors Q1 to Q4. At the output side of the bridge rectifier circuit, at least one capacitor C can be provided to adjust a predetermined minimal delay. Both resistors R1, R2 shown in FIG. 3 comprise a resistance which can be configured to adjust a sensitivity of the connection circuitry illustrated in FIG. 3.

As can be seen in FIG. 3, the second driver circuit 6B is connected to the output of the bridge rectifier circuit to receive a sum voltage $U_B$ at its driver input DESAT at the high voltage side of the second driver circuit 6B. The driver circuit 6B generates control signals CRTL applied to control gates of the power switches 5-1, 5-2. Depending on the voltages generated directly by the coils 4-1, 4-2, the driver circuit 6B generates a trigger switch-off control signal CRTL if the applied sum voltage $U_B$ exceeds a configurable threshold value $U_{TH}$.

FIG. 4 shows a block diagram for illustrating a possible exemplary embodiment of the driver circuits 6A, 6B implemented in the hybrid load protection apparatus 1 according to the present invention. In the illustrated embodiment, the driver circuit 6 can comprise a single IGBT driver IC1ED020/12-B2 manufactured by Infineon Technologies. The driver circuit 6 comprises two separate circuit halves galvanically separated by transformers T1, T2. The low voltage left side of the driver circuit 6 illustrated in FIG. 4 can be connected also to the control unit 8 of the hybrid load protection apparatus 1, in particular in response to control commands CMD or depending on measured current profiles.

In an alternative embodiment a specific designed ASIC may be used as a driver circuit 6.

The low voltage signal $U_A$ output by the coil 4A-2 coupled to the coil 4A-1 in the primary power supply path 1A is supplied in a possible implementation to the non-inverting driver input IN+ at the low voltage side of the driver circuit 6 as shown in FIG. 4.

In contrast, the sum voltage $U_B$ comprising the voltage drop $\Delta U_4$ along the coil 4B and along the semiconductor power switch 5B is applied in a possible implementation to the DESAT driver input on the high voltage side of the driver circuit 6. The sum voltage $U_B$ ($U_B = U_\Sigma = \Delta U4 + \Delta U5$) is compared by a comparator K3 with a configurable threshold voltage $U_{TH}$ of e.g. 9 Volts and travels along an OR gate OR1, an AND gate AND1 and an AND gate AND2 to an operation amplifier at the output stage of the driver output OUT at the high voltage side of the driver circuit 6. This control loop travelling along several gates and comparators has a very low propagation delay of less than 200 nsec.

The low voltage signal $U_A$ generated by the coil 4A-2 being coupled to the coil 4A-1 in the primary power supply path 1A is applied in a possible implementation to the non-inverting input IN+ at the low voltage side of the driver circuit 6 and travels via an AND gate 3 as shown in FIG. 4. The signal is coupled by the transformer T1 to the high voltage side and travels through AND gate AND2 and the output stage of the driver output OUT at the high voltage side of the driver circuit 6. Also, the signal propagation delay between the driver input IN+ and the driver output OUT is less than 200 nsec.

As can be seen from the block diagram of FIG. 1, the driver circuits 6 can operate independently from the control unit 8 to switch off an associated switch within a brief reaction time in case that an overcurrent is detected. No microprocessor of a control unit 8 is involved in the signal control path so that a very short switch-off period can be achieved.

In case of an overcurrent, the mechanical switch 5A can be switched off rapidly. To suppress an electrical arc caused by the rapid switch-off of the mechanical switch contact of the mechanical switch 5A, the secondary power supply path 1B can take over the electrical load current $I_L$ when the mechanical switch 5A is opened.

Also, when the mechanical switch 5A is opened by a microprocessor of the control unit 8 in response to a switch-off command CMD, the secondary power supply path 1B can provide suppression of the electrical arc at the opening mechanical switch 5A by redirecting the electrical current flowing through the primary power supply path 1A to the secondary power supply path 1B. The arc suppression increases the overall safety of the system. Further, the operation lifetime of the mechanical switch 5A can be increased by the efficient arc suppression provided by the secondary power supply path 1B. In case that an overcurrent is detected and the mechanical switch 5A is opened by the driver circuit 6A, the electrical current can commute from the primary power supply path 1A to the secondary power supply path 1B wherein the magnetic energy can be converted into electrical heat by the resistor 11 shown in the circuit diagram of FIG. 1. The resistance R of the resistor 11 is relatively low and may be in a range between 0.5 Ohm and 10 Ohm.

The hybrid load protection apparatus 1 can be provided for each power supply phase ($L_1$, $L_2$, $L_3$) of the AC power supply network PSN. This provides the additional advantage that each electrical phase of the power supply network PSN can be monitored independently from the other power supply phases.

The hybrid load protection apparatus 1 as shown in the block diagram of FIG. 1 can be integrated in the housing of a device. This device can comprise at each input terminal 2 a protruding electrical contact which is adapted to be inserted into a corresponding slot of a hybrid power supply busbar. Accordingly, the hybrid load protection apparatus 1 can be connected as a device to a busbar system. It may also be connected to a busbar system adapter or conventional massive busbars or hut rails. The hybrid load protection apparatus 1 can also be integrated in a fuse housing and adapted to replace a conventional fuse (such as an NH fuse).

The semiconductor power switch 5B provided within the secondary power supply path 1B can comprise an IGBT or a power MOSFET, in particular an SiC MOSFET, a GaN MOSFET or an ScAlN MOSFET.

The voltage drop $\Delta U_5$ along the semiconductor power switch 5B can comprise the drain-source voltage $U_{DS}$ between the source terminal and the drain terminal of the used semiconductor power MOSFET. The voltage drop $\Delta U_5$ along the semiconductor switch 5B can therefore increase in a non-linear manner when the electrical current I flowing through the secondary power supply path 1B is surging. Accordingly, the sum voltage $U_B$ applied to the DESAT driver input of the driver circuit 6B flows responsive to the momentary value of the electrical current I and to the momentary value of a rate of change of the electrical current, dI/dt. Consequently, the overcurrent detection provided in the secondary power supply path 1B is very robust and requires few electronic components to provide a reliable detection of a surging electrical current I. For the reliable detection, no calculation resources whatsoever are required. The detection of the overcurrent is performed independently from the control unit 8 completely by hardwired components without involving any time-consuming calculation or processing steps. In this way, very short switch-off periods can be achieved. Moreover, the hardwired overcurrent detection is very reliable and robust against environmental influences.

In a possible implementation of the hybrid load protection apparatus 1 according to the present invention, the mechanical switch 5A comprises a Thomson switch providing ultrafast actuator functionality. A Thomson coil implemented in the Thomson switch can contain two concentric coils with opposite current directions. Each coil can comprise a number of turns of conducting wire, usually made of copper with a isolating coating. The magnetic field produced by the coils causes electromagnetic forces forcing the coils apart from each other. After the hybrid load protection apparatus 1 has been triggered by an overcurrent and the mechanical switch 5A as well as the semiconductor power switch 5B have been opened, it is possible to reactivate the hybrid load protection apparatus 1 by a switch-on command applied to the control unit 8. Accordingly, the hybrid load protection apparatus 1 can be reused again. The dissipation power generated by the hybrid load protection apparatus 1 during normal operation is low. The power supply voltage $U_{AC}$ applied to the input terminals 2 can vary depending on the use case. The applied AC power supply voltage $U_{AC}$ can be more than 400 Volts, e.g. 690 Volts$_{Ac}$ with a frequency of 50 Hz. The hybrid load protection apparatus 1 may provide protection against a short circuit current up to 500 kAmp. After a short circuit overcurrent has been detected and the switches 5A, 5B have been opened, the hybrid load protection apparatus 1 can be reactivated after a waiting period in response to a control signal CMD applied to the control unit 8. Consequently, the hybrid load protection apparatus 1 is not destroyed by a short circuit overcurrent and can be reactivated for further use. The hybrid load protection apparatus 1 is designed to protect the electrical load 9 from damage caused by an excess current from an overload or a short circuit. Unlike a fuse which operates once and must be replaced, the hybrid load protection apparatus 1 according to the present invention can be reset either manually or automatically to resume normal operation. Since the service life of mechanical contacts is limited by the erosion of contact material due to arcing while interrupting the current, the normal operation lifetime of the hybrid load protection apparatus 1 is significantly increased by the provision of the secondary power supply path 1B provided for suppressing the generation of an electrical arc during switch-off of the mechanical switch 5A.

In a possible embodiment the driver circuits 6A, 6B can notify the control unit 8 about the momentary switching state of the mechanical switch 5A and the semiconductor power switch 5B via signal lines.

Once the fault condition has been cleared, the mechanical contact of the semiconductor switch 5B can be closed again automatically to restore the power supply to the electrical load 9. The hybrid load protection apparatus 1 can be used for a wide variety of different loads for different use cases. The hybrid load protection apparatus 1 is adapted to protect resistive, capacitive and also inductive loads against overcurrent. Even loads consuming a very high amount of electrical power can be protected efficiently by the hybrid load protection apparatus 1 according to the present invention.

The invention claimed is:

1. A hybrid load protection apparatus comprising:
a primary power supply path provided between an input terminal and an output terminal of said hybrid load protection apparatus and having a controllable mechanical switch connected in series with a primary coil coupled inductively to a secondary coil providing a voltage corresponding to a current rise speed of the electrical current flowing through the primary power supply path, wherein the provided voltage is applied directly to a driver input at a low voltage side of a first driver circuit associated with the primary power supply path to trigger automatically a switch-off of the mechanical switch within a first switch-off period to interrupt the primary power supply path; and
a secondary power supply path provided in parallel to the primary power supply path between the input terminal and the output terminal of said hybrid load protection apparatus and having a further coil connected in series with a semiconductor power switch, wherein a second driver circuit associated with the secondary power supply path is provided to detect an increasing electrical current flowing through the secondary power supply path caused by the interruption of the primary current path on the basis of a voltage drop generated by the further coil and a non-linear voltage drop along the semiconductor power switch applied as a sum voltage directly to a driver input at a high voltage side of the second driver circuit to trigger automatically a switch-off of the semiconductor power switch provided in the secondary power supply path within a second switch-off period to interrupt the secondary power supply path such that a generation of an electrical arc during switching-off of the mechanical switch is suppressed and the input terminal and the output terminal of the hybrid load protection apparatus are separated from each other.

2. The hybrid load protection apparatus according to claim 1 wherein the first driver circuit provided in the primary power supply path and the second driver circuit provided in the secondary power supply path are both adapted to generate automatically a trigger signal at a driver output at a high voltage side of the respective driver circuit.

3. The hybrid load protection apparatus according to claim 1 wherein the first predefined switch-off period for switching off the mechanical switch provided in the primary power supply path is less than 1 msec, in particular in a range between 1 μsec and 1 msec.

4. The hybrid load protection apparatus according to claim 1 wherein the mechanical switch provided in the primary power supply path comprises a switch-off acceleration unit adapted to accelerate a switch-off of a mechanical contact of the mechanical switch in response to a trigger signal received from the driver output at the high voltage side of the first driver circuit associated with the primary power supply path to interrupt the primary power supply path.

5. The hybrid load protection apparatus according to claim 4 wherein the switch-off acceleration unit of the mechanical switch provided in the primary power supply path comprises a pyrotechnic switch-off acceleration unit having a pyrotechnic charge fired in response to the trigger signal received from the driver output at the high voltage side of the first driver circuit to generate a pressurized gas which accelerates the switch-off of the mechanical contact of the mechanical switch to interrupt the primary power supply path.

6. The hybrid load protection apparatus according to claim 4 wherein the switch-off acceleration unit of the mechanical switch provided in the primary power supply path comprises a piezo element driving unit.

7. The hybrid load protection apparatus according to claim 1 wherein when the mechanical switch provided in the primary power supply path is switched off to interrupt the primary power supply path, the electrical current does flow increasingly into the secondary power supply path sensed by the coil in the secondary power supply path and the magnetic input energy is transformed into heat by means of a low impedance resistor provided in the secondary power supply path.

8. The hybrid load protection apparatus according to claim 1 wherein at least one energy storage unit, in particular a capacitor, is connected to the input terminal to store electrical energy used by the switch-off acceleration unit of the mechanical switch to accelerate the switch-off of the mechanical contact of the mechanical switch provided in the primary power supply path and/or is used as an auxiliary power supply.

9. The hybrid load protection apparatus according to claim 1 wherein the first switch-off period to switch off the mechanical switch in the primary power supply path and the second switch-off period to switch off subsequently the semiconductor power switch in the secondary power supply path are adjustable.

10. The hybrid load protection apparatus according to claim 1 wherein the input terminal is connected to a power supply network to receive an AC power supply voltage or is connected to a DC power supply source to receive a DC power supply voltage and wherein an electrical load protected by the hybrid load protection apparatus is connected to the output terminal of said hybrid load protection apparatus.

11. The hybrid load protection apparatus according to claim 1 wherein the primary power supply path is adapted to carry during normal operation an electrical current having a higher current amplitude than the electrical current flowing through the secondary power supply path.

12. The hybrid load protection apparatus according to claim 1 wherein both driver circuits comprise two galvanically separated parts coupled inductively by transformers to each other.

* * * * *